(12) United States Patent
Cioffi et al.

(10) Patent No.: US 7,813,420 B2
(45) Date of Patent: Oct. 12, 2010

(54) ADAPTIVE GDFE

(75) Inventors: John M. Cioffi, Atherton, CA (US);
Wonjong Rhee, Palo Alto, CA (US); Bin Lee, Mountain View, CA (US); Georgios Ginis, San Francisco, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 821 days.

(21) Appl. No.: 11/336,113

(22) Filed: Jan. 20, 2006

(65) Prior Publication Data

US 2006/0276918 A1      Dec. 7, 2006

Related U.S. Application Data

(60) Provisional application No. 60/686,549, filed on Jun. 2, 2005, provisional application No. 60/698,113, filed on Jul. 10, 2005.

(51) Int. Cl.
*H03H 7/30*   (2006.01)
*H03H 7/40*   (2006.01)

(52) U.S. Cl. ........................... 375/229; 375/222
(58) Field of Classification Search ......... 375/229–233, 375/222

See application file for complete search history.

(56) References Cited

U.S. PATENT DOCUMENTS 4,733,395 A    3/1988   Gelbrich et al.

(Continued)

FOREIGN PATENT DOCUMENTS

WO    WO-95/31867    11/1995

(Continued)

OTHER PUBLICATIONS

"International Search Report and Written Opinion", PCT Application No. PCT/US2007/013393, (Jan. 4, 2008).

(Continued)

*Primary Examiner*—Chieh M. Fan
*Assistant Examiner*—Freshteh N Aghdam
(74) *Attorney, Agent, or Firm*—Blakely, Sokoloff, Taylor & Zafman

(57) ABSTRACT

Adaptive generalized decision feedback equalization (GDFE) allows variations in one or more channels and noise of a multi-line/multi-channel communication system to be tracked. Such tracking can be used in vector upstream (one-sided) situations in communication systems such as ADSL and VDSL, among others. The GDFE may be separated into adaptive and static portions and/or components. Either a feed-forward section or a feedback section (or both) can be separated to create a static component and an adaptive component. The adaptive components adjust to the instantaneous channel and noise changes (for example, using the instantaneous errors and simple LMS algorithms). When the channel and noise do not exhibit any time-variation, the adaptive filters can zero themselves. Local updating of adaptive feedforward and/or feedback filters addresses rapid changes to the spatial correlation of noise and/or changes to the multi-line channel (for example, time-variation due to temperature changes, component variations, mechanical stress, and other reasons), without disruption to separate static feedforward and/or feedback filters supplied by a controller, such as a DSL optimizer or the like that can assist by doing the heavier calculations and providing vectoring information and data to the DSL line components. An efficient implementation is provided of any triangularization of the binder channel that characterizes multi-user vectored-DMT DSL. Adaptation also allows correction of any inaccuracy in initially or previously reported crosstalk transfer functions and noise spatial correlation.

18 Claims, 8 Drawing Sheets

U.S. PATENT DOCUMENTS

| | | | |
|---|---|---|---|
| 4,901,319 A | 2/1990 | Ross | |
| 5,023,872 A | 6/1991 | Annamalai | |
| 5,181,198 A | 1/1993 | Lechleider | |
| 5,450,420 A | 9/1995 | An et al. | |
| 5,510,917 A | 4/1996 | Corke et al. | |
| 5,511,119 A | 4/1996 | Lechleider | |
| 5,533,012 A | 7/1996 | Fukasawa et al. | |
| 5,541,955 A | 7/1996 | Jacobsmeyer | |
| 5,621,768 A | 4/1997 | Lechleider | |
| 5,901,205 A | 5/1999 | Smith et al. | |
| 6,067,646 A | 5/2000 | Starr | |
| 6,147,963 A | 11/2000 | Walker et al. | |
| 6,240,126 B1 | 5/2001 | Ohashi et al. | |
| 6,272,652 B1 | 8/2001 | Starr | |
| 6,310,909 B1 | 10/2001 | Jones | |
| 6,314,135 B1 | 11/2001 | Schneider et al. | |
| 6,449,288 B1 | 9/2002 | Chari et al. | |
| 6,507,608 B1 | 1/2003 | Norrell | |
| 6,536,001 B1 | 3/2003 | Cai et al. | |
| 6,546,509 B2 | 4/2003 | Starr | |
| 6,597,745 B1 | 7/2003 | Dowling | |
| 6,598,188 B1 | 7/2003 | Locke et al. | |
| 6,629,249 B2 | 9/2003 | Gonzalez | |
| 6,636,603 B1 | 10/2003 | Milbrandt | |
| 6,751,255 B1 * | 6/2004 | Reuven et al. | 375/233 |
| 6,792,049 B1 | 9/2004 | Bao et al. | |
| 6,940,973 B1 | 9/2005 | Yeap et al. | |
| 2003/0072380 A1 | 4/2003 | Huang | |
| 2003/0086362 A1 | 5/2003 | Hasegawa et al. | |
| 2003/0086514 A1 | 5/2003 | Ginis et al. | |
| 2003/0235245 A1 | 12/2003 | Erdogan et al. | |
| 2004/0086064 A1 | 5/2004 | Van Acker et al. | |
| 2004/0109546 A1 | 6/2004 | Fishman | |
| 2005/0052988 A1 | 3/2005 | Tsatsanis et al. | |
| 2005/0053229 A1 | 3/2005 | Tsatsanis et al. | |
| 2005/0129218 A1 | 6/2005 | Kimble et al. | |
| 2005/0152385 A1 | 7/2005 | Cioffi | |
| 2005/0195892 A1 | 9/2005 | Ginis et al. | |
| 2006/0056305 A1 * | 3/2006 | Oksman et al. | 370/252 |
| 2006/0109779 A1 | 5/2006 | Shah et al. | |
| 2006/0133519 A1 | 6/2006 | Tsatsanis et al. | |
| 2006/0146945 A1 | 7/2006 | Chow et al. | |

FOREIGN PATENT DOCUMENTS

| | | |
|---|---|---|
| WO | WO-01/35611 | 5/2001 |
| WO | WO-2004/027579 | 4/2004 |
| WO | WO-2005094052 | 10/2005 |

OTHER PUBLICATIONS

International Search Report, International Application No. PCT/IB2006/000884 (5 pgs).

Written Opinion of the International Searching Authority, International Application No. PCT/IB2006/000884 (6 pgs).

Ginis et al., "Vectored Transmission for Digital Subscriber Line Systems," IEEE Journal on Selected Areas in Communications; Jun. 2002 (pp. 1085-1104). XP-001143167 (20 pgs).

Ginis et al., "Blind Adaptive MIMO Decision Feedback Equalization Using Givens Rotations," ICC 2002, 2002 IEEE International Conference on Communications—Proceedings; vol. 1 of 5; Apr. 28, 2002 (pp. 59-63). XP-010589458 (5 pgs).

Cioffi et al., "Canonical Packet Transmission on the ISI Channel with Gaussian Noise," Global Telecommunications Conference; London, UK; Nov. 18, 1996 (pp. 1405-1410). XP-010220148 (6 pgs).

Voyan Technology, "Vectoring Techniques for Multi-Line 10MDSL Systems".

Cendrillion, Raphael et al., "Improved Linear Crosstalk Precompsensation for DSL".

Cendrillion, Raphael et al., "Partial Crosstalk Cancellation Exploiting Line and Tone Selection in VDSL".

Cendrillion, Raphael et al., "Partial Crosstalk Cancellation for Upstream DSL", (2004).

Cendrillion, Raphael et al., "Partial Crosstalk precompensation in downstream DSL", (Apr. 22, 2004).

Cendrillion, Raphael et al., "The Linear Zero-Forcing Crosstalk Canceler is Near-optimal in DSL Channels".

Cheong, Minho et al., "Computationally Efficient Cancellation of Partially-overlapped Crosstalk in Digital Subscriber Lines", (2005).

Cioffi, John M., "Dynamic Spectrum Management".

Cioffi, John M., "Dynamic Spectrum Management Report".

Cioffi, John M., "Spectrum Management with Advancing DSLs".

Cioffi, John et al., "Vectored VDSL (99-559)".

Forouzan, Amir R., "Generalized Iterative Spectrum Balancing and Grouped Vectoring for Maximal Throughput of Digial Subscriber Lines".

Ginis, George et al., "Alien Crosstalk Cancellation for Multipair Digital Subscriber Line Systems", (2006).

Ginis, George et al., "Vectored Transmission for Digital Subscriber Line Systems", (2001).

Ilani, Ishai, "Crosstalk Cancellation for Multi-Line G.shdsl Systems".

Im, Gi-Hong et al., "Fext Cancellation for Multi-Carrier Transmission System", (Apr. 11, 2002).

Song, Kee Bong ,et al., "Dynamic Spectrum Management for Next-Generation DSL Systems", (Oct. 2002).

"ITU-T "Recommendation G.992.1"", *Asymetric digital subscriber line (ADSL) transceivers, Series G, as provided by International Searching Authority*, Reference No. XP-002321806, (Jun. 1999), 226-239.

Cendrillon, et al., "Improved Linear Crosstalk Precompensation for DSL", *IEEE International Conference on Acoustics, Speech and Signal Processing (ICASSP)*, (Sep. 2004), 4 pgs.

Cendrillon, et al., "Partial Crosstalk Cancellation for Upstream VDSL", *EURASIP Journal on Applied Signal Processing*, (Oct. 2004), 16 pgs.

Cioffi, John , "Dynamic Spectrum Management", *Alcatel DSL Forum presentation*, Paris, France., (Nov. 11, 2003).

Cioffi, John , "Dynamic Spectrum Management", *Deutsche Telecom DSL presentation*; Darmstadt, Germany., (Oct. 6, 2003).

Cioffi, John , "Dynamic Spectrum Management", *IEEE Globalcom presentation*; San Francisco, California., (Dec. 3, 2003).

Cioffi, John , "Dynamic Spectrum Management", *Telecom Italia presentation*; Turin, Italy., (Nov. 19, 2003).

Cioffi, John , "Dynamic Spectrum Management", *Korea Telecom DSL presentation*; Seoul, Korea., (Sep. 24, 2003).

Cioffi, John , et al., "Low-Latency Impulse Elimination", *Committee T1, Working Group T1E1.4 (DSL Access)*; Atlanta GA;, (Apr. 8, 2002).

Cioffi, John , et al., "MIMO Channel Measurement Test Plan", (Feb. 17, 2003).

Cioffi, John , "The Fast Adaptive Rotor's RLS Algorithm", *IEEE Transactions on Acoustics, Speech and Signal Processing*, New York, NY, US vol. 38, No. 4, (Apr. 1, 1990), pp. 631-653.

Cuypers, et al., "Combined per tone equalization and receiver windowing in DSL receivers: WiPTEQ", *Elsevier Science Publishers*, Amsterdam, NL, vol. 85, No. 10, (Oct. 2005), pp. 1921-1942.

Cuypers, et al., "Combining Per Tone equalization and windowing in DMT receivers", *IEEE International Conference on Acoustics, Speech and Signal Processing (ICASSP)*; Orlando, Florida.

Fang, Jeannie L., "Modeling and Characterization of Copper Access Systems", (May 31, 2002).

Fischer, "Appendix E of "Precoding and Signal Shaping for Digital Transmission"", *Wiley-IEEE Press*, ISBN: 978-0-471-22410-5, (Aug. 2002), 10 pgs.

Ginis, George , et al., "A Multiuser precoding scheme achieving crosstalk cancellation with application to DSL systems", *Signals, Systems, and Computers, 200. IEEE* vol. 2., (Oct. 29, 2000), pp. 1627-1631.

Harashima, et al., "Matched-transmission technique for channels with intersymbol interference", *IEEE Transactions on Communication*; vol. COM-20, No. 4, (Aug. 1972), 774-780.

Laroia, et al., "A Simple and Effective Precoding Scheme for Noise Whitening in Intersymbol Inference Channels", *IEEE Trans. on Communication*; vol. 41, (Oct. 1993), 1460-1463.

Lee, et al., "Binder MIMO Channels", *submitted to IEEE Journal on Selected Areas in Communications*, Reference No. XP-001143167, (Jun. 2002), 20 pgs.

Louveaux, J., et al., "Downstream VDSL channel tracking using limited feedback for crosstalk precompensated schemes", *Acoustics, Speech and Signal Processing*, 2005, (Mar. 18, 2005), pp. 337-340.

Magesacher, et al., "Exploiting the Common-Mode Signal in xDSL", *Proc. 12th European Signal Processing Conference (EUSIPCO 2004)*, Vienna, Austria, Sep. 7-10, 2004., (Sep. 2004), 4 pgs.

Moulin, F., et al., "Discrete-multitone-based ADSL and VDSL systems performance analysis in an impulse noise environment", *IEEE Proceedings: Sci Meas. Technol.* vol. 150 No. 6, Reference No. XP-006024286, (Nov. 3, 2003), 273-78.

Nedev, N., et al., "Comparison between Interleaving and Multiple DMT Symboles per RS Codeword in ADSL Systems", *Globalcom 2002—IEEE Global Telecommunications Conference*; Taipei, Taiwan., Reference No. XP-010636152, (Nov. 17, 2002), 2265-69.

Otte, M, et al., "Complex CORDIC-like algorithms for linearly constrained MVDR beamforming", *Broadband Communications*, 2000. Piscataway, NJ, US., (Feb. 15, 2000), pp. 97-104.

Paul, Clayton R., "Analysis of Multiconductor Transmission Lines", *John Wiley & Sons*, Chapters 2 and 3, (1994), 46-186.

Starr, et al., "DSL Advances", *Chapters 3, 7, and 11: Prentice-Hall*, (2003).

Starr, et al., "Information comment solicitation on ITU FEC INP submission for ADSL2", *Committee T1, Working group T1E1.4 (DSL Access)*; Vancouver, BC, (Feb. 23, 2004).

Starr, et al., "Proposed revisions to G.992.4 and G.992.3&5 regarding impulse noise protection", *Study group 15, ITU—Telecommunications Standardization Sector*; San Francisco, California., (Mar. 8, 2004).

Tomlinson, "New Automatic Equaliser Employing Modulo Arithmetic", *Electr. Letters*; vol. 7., (Mar. 1971), 138-139.

Veithen, D, et al., "A 70Mb/s Variable-Rate DMT-Based Modem for VDSL", *1999 IEEE International Solid-State Circuits Conference; ISSCC99/Session_14/Paper TP 14.6.*, Reference No. XP-002184687, (Feb. 15, 1999), 248-249.

Wei, "Generalized Square and Hexagonal Constellations for Intersymbol-Interference Channels with Generalized Tomlinson-Harashima Precoders", *IEEE Transactions on Communications*, vol. 42, No. 9, (Sep. 1994), 9 pgs.

USPTO, Non-Final Office Action for U.S. Appl. No. 10/795,593, (Mar. 21, 2007) 18 pgs.

USPTO, Final Office Action for U.S. Appl. No. 10/795,593, (Oct. 22, 2007) 13 pgs.

USPTO, Notice of Allowance for U.S. Appl. No. 10/795,593, (May 5, 2008) 6 pgs.

USPTO, Non-Final Office Action for U.S. Appl. No. 11/336,666, (Nov. 13, 2008), 27 pgs.

"International Search Report and Written Opinion," International Application No. PCT/IB2006/000499, (Jun. 9, 2006), 12 pgs.

"International Search Report and Written Opinion," International Application No. PCT/IB2006/000759, (Aug. 16, 2006), 16 pgs.

"International Search Report and Written Opinion," International Application No. PCT/IB2004003961, (Apr. 7, 2005), 10 pgs.

"International Search Report and Written Opinion," International Application No. PCT/IB2006/000482, (May 16, 2006) 9 pgs.

International Preliminary Report on Patentability, International Application No. PCT/US2007/013393, (Dec. 24, 2008) 8 pgs.

EPO, "First Office Action", European Application No. 04801294.2, (Jun. 27, 2008), Whole Document.

Final Office Action for U.S. Appl. No. 11/336,666, Mailed Jan. 20, 2010,14 pages.

Examiner's Report for Australian Application No. 2004298118 mailed Nov. 23, 2009, 2 pages.

Examiner's Report for Australian Application No. 2004298118 mailed Jan. 23, 2009, 2 pages.

USPTO, Final Office Action for U.S. Appl. No. 11/336,666, Mailed May 13, 2009, 13 pages.

USPTO, Non-Final Office Action for U.S. Appl. No. 11/336,666 Mailed Jul. 31, 2009, 18 pages.

European Patent Office, Examination Report, European Application No. 07795837.9, (Apr. 1, 2009) 4 pages.

European Patent Office, Examination Report, European Application No. 06727480.3, (Jan. 30, 2009), 5 pages.

Proakis, John G., "Digital Communications, third edition", 1995 McGraw-Hill Inc., (2005), 621-622.

State Intellectual Property, Office of PR China , "Notification of the First Office Action" with translation, Chinese Patent Application No. 200480040960.5, (Mar. 27, 2009), 10 pages.

\* cited by examiner

ADAPTIVE GDFE

CROSS-REFERENCE TO RELATED APPLICATIONS

This application claims the benefit of priority under 35 U.S.C. §119(e) of the following:

U.S. Provisional No. 60/686,549 filed on Jun. 2, 2005, entitled TONAL PREDICTIVE GDFE, the entire disclosure of which is incorporated herein by reference in its entirety for all purposes.

U.S. Provisional No. 60/698,113 filed on Jul. 10, 2005, entitled DSL SYSTEM, the entire disclosure of which is incorporated herein by reference in its entirety for all purposes.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND

1. Technical Field

This invention relates generally to methods, systems and apparatus for managing digital communications systems.

2. Description of Related Art

Digital subscriber line (DSL) technologies provide potentially large bandwidth for digital communication over existing telephone subscriber lines (referred to as loops and/or the copper plant). In particular, DSL systems can adjust to the characteristics of the subscriber line by using a discrete multitone (DMT) line code that assigns a number of bits to each tone (or sub-carrier), which can be adjusted to channel conditions as determined during training and initialization of the modems (typically transceivers that function as both transmitters and receivers) at each end of the subscriber line.

In DSL systems, crosstalk that occurs among the twisted pairs typically reduces and/or limits performance. It is known that joint processing of signals transmitted and/or received by a group of lines (commonly described as "vectoring") can assist in reducing crosstalk. In some cases, the joint signal processing among the group of lines is performed at the receiver side only (for example, in cases where the transmitters of the lines belonging to the group are geographically dispersed), which is the case for some DSL upstream communication. The joint receiver signal processing often is described as generalized decision feedback equalization.

Systems, apparatus, methods and techniques that provide improvements for implementing generalized decision feedback equalization would represent a significant advancement in the art. Also, systems, apparatus, methods and techniques for implementing such equalization that can adapt dynamically to changing line conditions likewise would represent a significant advancement in the art.

BRIEF SUMMARY

Embodiments of the present invention utilize a generalized decision feedback equalizer (GDFE) that allows variations in one or more channels and noise of a multi-line/multi-channel communication system to be tracked. Such tracking can be used in vector upstream (one-sided) situations in communication systems such as ADSL and VDSL, among others. The present invention also takes advantage of the fact that with coded systems, the vector receiver can also use iterative decoding for a prescribed user order to minimize error propagation effects and/or to improve performance.

Embodiments of the present invention also include means to locally update adaptive feedforward and/or feedback filters to address rapid changes to the spatial correlation of noise and/or changes to the multi-line channel, without disruption to separate static feedforward and/or feedback filters supplied by an external controller. Where the present invention is applied to DSL systems, either the local controller (that is, for example, a control unit in a DSLAM, LT device, or other upstream-end DSL line component) and/or a remote controller (for example, a control unit in a location outside the DSL loop and its modems, DSLAM, etc.) may be a DSL optimizer or the like that can assist by doing the heavier calculations and providing vectoring information and data to the DSL line components.

Embodiments of the present invention provide an efficient implementation of the R matrix in the H=QR factorization, or more generally any triangularization of the binder channel, that characterizes multi-user upstream vectored-DMT VDSL one-sided receivers (or any receiver when two-sided vectoring is used). Embodiments of the present invention are referred to as adaptive GDFE. Unlike downstream "broadcast" channels with precoding, where the worst-case spatially-correlated noise on each tone is constant and imposes a constant limit upon performance for any given choice of the users' input spectra, considerable performance improvement is possible for upstream channels when and if a vector receiver adapts to the actual spatially-correlated noise correlation. Additionally, the multi-line channel experiences time-variation due to temperature changes, component variations, mechanical stress, and other reasons. Thus, adaptation to such changes of the channel is also needed.

Such adaptation to channel and noise would be difficult to control centrally at a remote location (such as a remote location controller or a remote DSL optimizer) because of the potential speed of the noise variation. The adaptation also allows correction of any inaccuracy in initially or previously reported crosstalk transfer functions and noise spatial correlation. The present invention separates the GDFE into an adaptive portion and a static portion. The adaptive portion of the GDFE is implemented (and computed/updated) locally within the vector receiver. The remaining static portion can be computed appropriately by a controller (such as a DSL optimizer). Examples are provided using DSL as an illustrative communication system, but the invention applies to any system where vectored multi-user reception is used.

The G matrix in R=SG (where S is a diagonal scaling matrix that forces the diagonal elements of the triangular G to be all ones) is implemented as a feedback section using the decisions of other users (or in some embodiments of the invention, an iteratively decoded multi-user detector). Alternatively, errors (defined as the differences between decisions and inputs to the decision device/process) are computed and used as inputs to the feedback section. Either the feedforward section or the feedback section or both can be separated to create a static component and an adaptive component. The adaptive components adjust to the instantaneous channel and noise changes (for example, using the instantaneous errors and simple LMS algorithms). When the channel and noise do not exhibit any time-variation, the adaptive filters can zero themselves.

Further details and advantages of the invention are provided in the following Detailed Description and the associated Figures.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
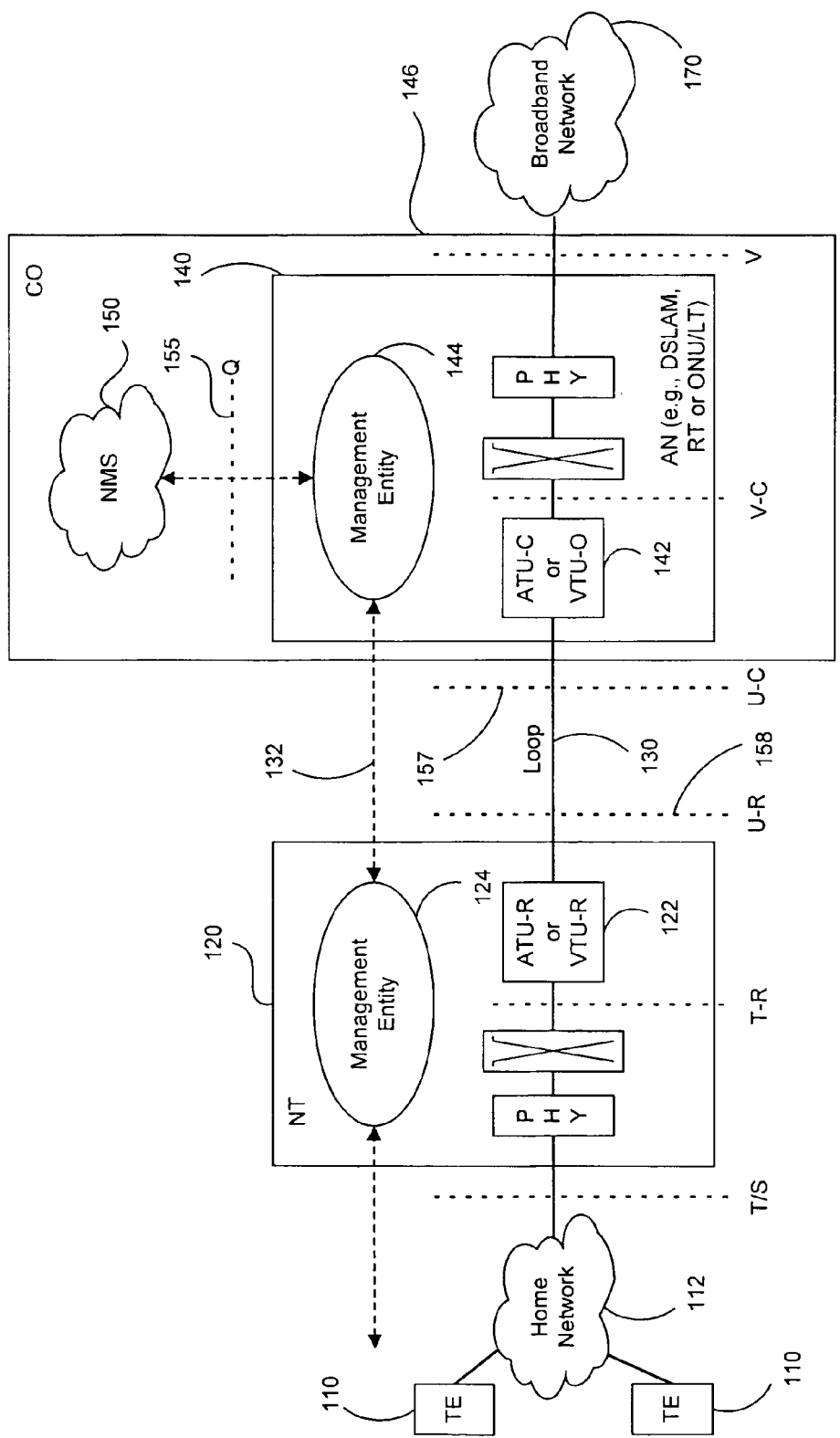
FIG. 1 is a schematic block reference model system per the G.997.1 standard applicable to ADSL, VDSL and other communication systems in which embodiments of the present invention may be used.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments.

Embodiments of the present invention implement methods and apparatus that permit joint or successive decoding (known here as generalized decision feedback equalization, GDFE, where the term "GDFE" can be used interchangeably to refer to either the process of equalization and/or to an equalizer—a device, apparatus, method, etc. that performs such equalization) of different users' signals in a communication system. The communication system in which embodiments of the present invention may be used may include ADSL lines, VDSL lines and/or or any other communication system components and/or lines with which the present invention is practical, as will be appreciated by those skilled in the art after reading the present disclosure. Moreover, those skilled in the art will understand that, while the term "generalized decision feedback equalization" and the like are used herein to describe aspects and embodiments of the present invention, the invention is not limited to "feedback" systems and components, per se, only. That is, embodiments of the present invention utilize feedforward and other components that are nevertheless considered part of a generalized decision feedback equalization system, method, device, etc. Therefore the term "feedback" within GDFE terminology is not limiting to feedback alone.

Some embodiments of the present invention are referred to as "tonal predictive GDFEs." These typically indicate that there is one GDFE per tone and that there is a noise predictive structure. Some embodiments of the present invention are referred to as "adaptive GDFEs" that typically have a single GDFE per tone and are adaptive to noise and/or channel. As will be appreciated by those skilled in the art, there is thus some possible overlap and interchangeability of these and other, similar terms. The term "adaptive GDFE" is to be construed broadly herein to include any GDFE device, method, etc. that includes adaptability to noise and/or channel, which therefore might include "tonal predictive GDFEs" as well.

Moreover, there are references to "static" components and "adaptive" components in embodiments of the present invention. These terms are to be construed relative to one another and imply a matter of degree, not absolutely static devices and/or operation. As will be appreciated by those skilled in the art after reading the present disclosure, a filter or matrix referred to as "static" herein means a filter or matrix that is not actually fixed in many cases, but instead requires only infrequent updating or other changes (by a controller or other entity), and might be updated from time to time, as appropriate. For example, in a DSL system, these static components would not rapidly change during SHOWTIME, but might be updated with each initialization or over a longer interval (for example, every few hours). Likewise, a filter or matrix referred to herein as "adaptive" is meant to mean a filter or matrix that requires relatively fast and/or frequent updating due to changing characteristics and/or conditions. The context and use of the embodiments of the present invention described below provide those skilled in the art with sufficient information to determine which type of meaning is in use.

As described in more detail below, implementation of adaptive GDFEs implementing one or more embodiments of the present invention can be part of a communication device (for example, a controller, DSL optimizer, DSLAM, LT device, RT device, DSL modem and the like). Such implementation may be controlled and/or assisted by a GDFE control unit in a local device (again, for example, a DSLAM, LT device, modem, etc.) and/or in a remote device, such as a controller (for example, in or as a DSL optimizer, dynamic spectrum manager or spectrum management center). The GDFE control unit can be located anywhere. In some embodiments, a controller having a GDFE control unit resides in a DSL CO, while in other cases it may be operated by a third party located outside the CO. The structure, programming and other specific features of a controller and/or GDFE control unit usable in connection with embodiments of the present invention will be apparent to those skilled in the art after reviewing the present disclosure.

A controller, such as a DSL optimizer, dynamic-spectrum-management center (DSM Center), a "smart" modem and/or computer system can be used to collect and analyze the operational data and/or performance parameter values as described in connection with the various embodiments of the present invention. The controller and/or other components can be a computer-implemented device or combination of devices. In some embodiments, the controller is in a location remote from modems or other communication equipment coupled to a communication line. In other cases, the controller may be collocated with one of or both of the "local" devices (that is, devices directly coupled to a communication line or part of such a local device) as equipment directly connected to a modem, DSLAM or other communication system device, thus creating a "smart" modem. The phrases "coupled to" and "connected to" and the like are used herein to describe a connection between two elements and/or components and are intended to mean coupled either directly together, or indirectly, for example via one or more intervening elements or via a wireless connection, where appropriate.

Some of the following examples of embodiments of the present invention will be used in connection with one-sided or two-sided vectored ADSL and/or VDSL systems as exemplary communications systems. Within these DSL systems, certain conventions, rules, protocols, etc. may be used to describe operation of the exemplary DSL system and the information and/or data available from customers (also referred to as "users") and/or equipment on the system. However, as will be appreciated by those skilled in the art, embodiments of the present invention may be applied to various communications systems, and the invention is not limited to any particular system.

Various network-management elements are used for management of ADSL and VDSL physical-layer resources, where elements refer to parameters or functions within an ADSL or VDSL modem pair, either collectively or at an individual end. A network-management framework consists of one or more managed nodes, each containing an agent. The managed node could be a router, bridge, switch, modem or other. At least one NMS (Network Management System), which is often called the manager, monitors and controls managed nodes and is usually based on a common PC or other computer. NMS is in some instances also referred to as an Element Management System (EMS). A network management protocol is used by the manager and agents to exchange management information and data. The unit of management information is an object. A collection of related objects is defined as a Management Information Base (MIB).

FIG. 1 shows the reference model system according to the G.997.1 standard (G.ploam), which applies to various ADSL and VDSL systems, which is well known to those skilled in the art, and in which embodiments of the present invention can be implemented. This model applies to ADSL and VDSL systems meeting the various standards that may or may not include splitters, such as ADSL1 (G.992.1), ADSL-Lite (G.992.2), ADSL2 (G.992.3), ADSL2-Lite (G.992.4), ADSL2+ (G.992.5), VDSL1 (G.993.1) and other G.993.x emerging VDSL standards, as well as the G.991.1 and G.991.2 SHDSL standards, all with and without bonding. These standards, variations thereto, and their use in connection with the G.997.1 standard are all well known to those skilled in the art.

The G.997.1 standard specifies the physical layer management for ADSL and VDSL transmission systems based on the clear embedded operation channel (EOC) defined in G.997.1 and use of indicator bits and EOC messages defined in G.99x standards. Moreover, G.997.1 specifies network management elements content for configuration, fault and performance management. In performing these functions, the system utilizes a variety of operational data that are available at and can be collected from an access node (AN). The DSL Forum's TR69 report also lists the MIB and how it might be accessed. In FIG. 1, customers' terminal equipment 110 is coupled to a home network 112, which in turn is coupled to a network termination unit (NT) 120. In the case of an ADSL system, NT 120 includes an ATU-R 122 (for example, a modem, also referred to as a transceiver in some cases, defined by one of the ADSL and/or VDSL standards) or any other suitable network termination modem, transceiver or other communication unit. The remote device in a VDSL system would be a VTU-R. As will be appreciated by those skilled in the art and as described herein, each modem interacts with the communication system to which it is connected and may generate operational data as a result of the modem's performance in the communication system.

NT 120 also includes a management entity (ME) 124. ME 124 can be any suitable hardware device, such as a microprocessor, microcontroller, or circuit state machine in firmware or hardware, capable of performing as required by any applicable standards and/or other criteria. ME 124 collects and stores performance data in its MIB, which is a database of information maintained by each ME, and which can be accessed via network management protocols such as SNMP (Simple Network Management Protocol), an administration protocol used to gather information from a network device to provide to an administrator console/program or via TL1 commands, TL1 being a long-established command language used to program responses and commands between telecommunication network elements.

Each ATU-R in a system is coupled to an ATU-C in a CO or other upstream and/or central location. In a VDSL system, each VTU-R in a system is coupled to a VTU-O in a CO or other upstream and/or central location (for example, any line termination device such as an ONU/LT, DSLAM, RT, etc.). In FIG. 1, ATU-C 142 is located at an access node (AN) 140 in a CO 146. AN 140 may be a DSL system component, such as a DSLAM, ONU/LT, RT or the like, as will be appreciated by those skilled in the art. An ME 144 likewise maintains an MIB of performance data pertaining to ATU-C 142. The AN 140 may be coupled to a broadband network 170 or other network, as will be appreciated by those skilled in the art. ATU-R 122 and ATU-C 142 are coupled together by a loop 130, which in the case of ADSL (and VDSL) typically is a telephone twisted pair that also carries other communication services.

Several of the interfaces shown in FIG. 1 can be used for determining and collecting operational and/or performance data. To the extent the interfaces in FIG. 1 differ from another ADSL and/or VDSL system interface scheme, the systems are well known and the differences are known and apparent to those skilled in the art. The Q-interface 155 provides the interface between the NMS 150 of the operator and ME 144 in AN 140. All the parameters specified in the G.997.1 standard apply at the Q-interface 155. The near-end parameters supported in ME 144 are derived from ATU-C 142, while the far-end parameters from ATU-R 122 can be derived by either of two interfaces over the U-interface. Indicator bits and EOC messages, which are sent using embedded channel 132 and are provided at the PMD layer, can be used to generate the required ATU-R 122 parameters in ME 144. Alternately, the OAM (Operations, Administrations and Management) channel and a suitable protocol can be used to retrieve the parameters from ATU-R 122 when requested by ME 144. Similarly, the far-end parameters from ATU-C 142 can be derived by either of two interfaces over the U-interface. Indicator bits and EOC messages, which are provided at the PMD layer, can be used to generate the required ATU-C 142 parameters in ME 124 of NT 120. Alternately, the OAM channel and a suitable protocol can be used to retrieve the parameters from ATU-C 142 when requested by ME 124.

At the U-interface (which is essentially loop 130), there are two management interfaces, one at ATU-C 142 (the U-C interface 157) and one at ATU-R 122 (the U-R interface 158). Interface 157 provides ATU-C near-end parameters for ATU-R 122 to retrieve over the U-interface 130. Similarly, interface 158 provides ATU-R near-end parameters for ATU-C 142 to retrieve over the U-interface 130. The parameters that apply may be dependent upon the transceiver standard being used (for example, G.992.1 or G.992.2).

The G.997.1 standard specifies an optional OAM communication channel across the U-interface. If this channel is implemented, ATU-C and ATU-R pairs may use it for transporting physical layer OAM messages. Thus, the transceivers 122, 142 of such a system share various operational and performance data maintained in their respective MIBs.

More information can be found regarding ADSL NMSs in DSL Forum Technical Report TR-005, entitled "ADSL Network Element Management" from the ADSL Forum, dated March 1998. Also, DSL Forum Technical Report TR-069, entitled "CPE WAN Management Protocol," dated May 2004. Finally, DSL Forum Working Text TR-064, entitled "LAN-Side DSL CPE Configuration Specification," dated May 2004. These documents address different situations for CPE side management and the information therein is well known to those skilled in the art. More information about VDSL can be found in the ITU standard G.993.1 (sometimes called "VDSL1") and the emerging ITU standard G.993.2 (sometimes called "VDSL2"), as well as several DSL Forum working texts in progress, all of which are known to those skilled in the art. For example, additional information is available in the DSL Forum's Technical Report TR-057 (Formerly WT-068v5), entitled "VDSL Network Element Management" (February 2003) and Technical Report TR-065, entitled "FS-VDSL EMS to NMS Interface Functional Requirements" (March 2004) as well as in the emerging revision of ITU standard G.997.1 for VDSL1 and VDSL2 MIB elements, or in the ATIS North American Draft Dynamic Spectrum Management Report, NIPP-NAI-2005-031.

It is more common for lines sharing the same binder to terminate on the same line card in VDSL than in ADSL. However, the following discussion of xDSL systems may be extended to ADSL because common termination of same-binder lines might also be done (especially in a newer DSLAM that handles both ADSL and VDSL). In a typical topology of a DSL plant, in which a number of transceiver pairs are operating and/or are available, part of each subscriber loop is collocated with the loops of other users within a multi-pair binder (or bundle). After the pedestal, very close to the Customer Premises Equipment (CPE), the loop takes the form of a drop wire and exits the bundle. Therefore, the subscriber loop traverses two different environments. Part of the loop may be located inside a binder, where the loop is sometimes shielded from external electromagnetic interference, but is subject to crosstalk. After the pedestal, the drop wire is often unaffected by crosstalk when this pair is far from other pairs for most of the drop, but transmission can also be more significantly impaired by electromagnetic interference because the drop wires are unshielded. Many drops have 2 to 8 twisted-pairs within them and in situations of multiple services to a home or bonding (multiplexing and demultiplexing of a single service) of those lines, additional substantial crosstalk can occur between these lines in the drop segment.

Figure 2:
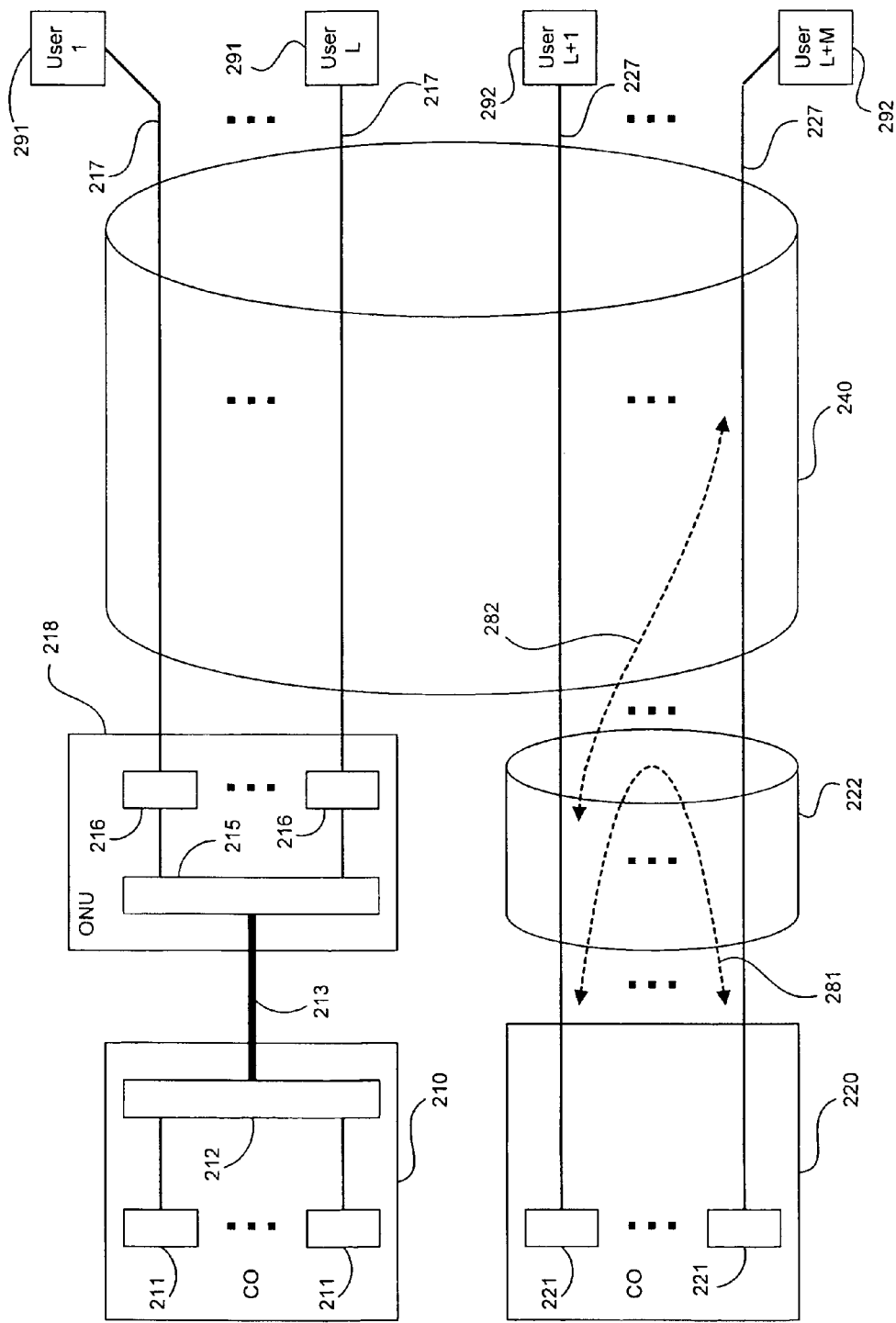
FIG. 2 is a schematic diagram illustrating generic, exemplary DSL deployment.

A generic, exemplary DSL deployment scenario is shown in FIG. 2. All the subscriber loops of a total of (L+M) users 291, 292 pass through at least one common binder. Each user is connected to a Central Office (CO) 210, 220 through a dedicated line. However, each subscriber loop may be passing through different environments and mediums. In FIG. 2, L customers or users 291 are connected to CO 210 using a combination of optical fiber 213 and twisted copper pairs 217, which is commonly referred to as Fiber to the Cabinet (FTT-Cab) or Fiber to the Curb. Signals from transceivers 211 in CO 210 have their signals converted by optical line terminal 212 and optical network terminal 215 in CO 210 and optical network unit (ONU) 218. Modems 216 in ONU 218 act as transceivers for signals between the ONU 218 and users 291.

Users' lines that co-terminate in locations such as COs 210, 218 and ONU 220 (as well as others) may be operated in a coordinated fashion, such as vectoring. In vectored communication systems (such as vectored ADSL and/or VDSL systems), coordination of signals and processing can be achieved. Downstream vectoring occurs when multiple lines' transmit signals from a DSLAM or LT are co-generated with a common clock and processor. In VDSL systems with such a common clock, the crosstalk between users occurs separately for each tone. Thus each of the downstream tones for many users can be independently generated by a common vector transmitter. Similarly, upstream vectoring occurs when a common clock and processor are used to co-receive multiple lines' signals. In VDSL systems with such a common clock, the crosstalk between users occurs separately for each tone. Thus each of the upstream tones for many users can be independently processed by a common vector receiver.

The loops 227 of the remaining M users 292 are copper twisted pairs only, a scenario referred to as Fiber to the Exchange (FTTEx). Whenever possible and economically feasible, FTTCab is preferable to FTTEx, since this reduces the length of the copper part of the subscriber loop, and consequently increases the achievable rates. Moreover, FTT-Cab is expected to become an increasingly popular topology. This type of topology can lead to substantial crosstalk interference and may mean that the lines of the various users have different data carrying and performance capabilities due to the specific environment in which they operate. The topology can be such that fiber-fed "cabinet" lines and exchange lines can be mixed in the same binder. The crosstalk noises created by lines terminating at different places usually cannot be canceled directly by well-known decision-feedback mechanisms and instead represent time-varying spatially-correlated noises that can be completely or partially canceled by the invention described herein.

As can be seen in FIG. 2, the lines from CO 220 to users 292 share binder 222, which is not used by the lines between CO 210 and users 291. Moreover, another binder 240 is common to all the lines to/from CO 210 and CO 220 and their respective users 291, 292. In FIG. 2, far end crosstalk (FEXT) 282 and near end crosstalk (NEXT) 281 are illustrated as affecting at least two of the lines 227 collocated at CO 220.

As will be appreciated by those skilled in the art, at least some of the operational data and/or parameters described in these documents can be used in connection with embodiments of the present invention. Moreover, at least some of the system descriptions are likewise applicable to embodiments of the present invention. Various types of operational data and/or information available from a DSL NMS can be found therein; others may be known to those skilled in the art.

Communication systems such as DSL systems experience noise in various forms. For example, upstream noise in a DSL system can be divided into two types: The first type is crosstalk noise-signals induced by other, nearby lines (for example, in the same binder, cable, or unit), lines that are coordinated together for reception (that is, vectored). In light of the present invention, these crosstalk signals are no longer viewed as noise from the standpoint of a vector receiver and crosstalk between the lines can be canceled. This first type of crosstalk noise can even be "good" noise in that portions of signal energy that are received on another line in the vectored group can allow performance to be improved for the received signal because its gain level increases if all the crosstalk components are appropriately filtered and summed. When all lines are excited differentially, the performance limit within a vectored group is equivalent to a situation in which each line sees no crosstalk at all from the others, usually a significant improvement.

The second type of noise is any noise that is not generated by a signal within the vectored group of lines where signals are co-received. Such noise can be uncoordinated crosstalkers (that is, non-vectored users) or can be radio noise (such as that from AM radio broadcasts, amateur radio transmitters, other man-made sources, or impulse noise). This second type of noise can also be substantially mitigated when this second type of noise has a common source and is evident on multiple received lines—such a situation is often called "spatially correlated" noise because the noise on several lines across the "space" of the binder is correlated. If the spatial correlation of the noise is sufficiently strong among the vectored users, substantial reduction of this other type of noise is possible in a vector receiver by canceling the noise or by avoiding noise with receiver filters.

When vectoring is used at the receiver, the first type of noise (that is, crosstalk from the vectored line set) can be canceled by the combination of the feedforward and feedback filters of a GDFE. The remaining, second type of noise (including, for example, radio noise) that has not been canceled is treated as spatially correlated noise and it can also be reduced using a GDFE that is computed from the "noise-whitened-channel." In some embodiments of the present invention, only one of either the first type of noise or the second type of noise is addressed. When time variation effects are not present, the canceling steps for either the first type of noise or for the second type of noise are known to those skilled in the art. However, the first type of noise can vary over time due to temperature changes, changes in component characteristics, mechanical stress and other changes in the transmission environment. The second type of noise can vary even more rapidly in its correlation properties because of noise source changes. Thus, it is difficult for a controller to track and update systems that cancel the first or second type of noise. It is this rapid time variation that is adaptively found and controlled within the vectored DSL upstream receiver using embodiments of the present invention in novel and nonobvious ways.

A vectored DMT channel (both upstream and downstream) is characterized in synchronized digitally duplexed DSL systems by the simple matrix equation:

$$Y = HX + N \qquad \text{Equation (1)}$$

where H (also denoted $\underline{H}$ as well) is a matrix that describes the insertion loss and crosstalk on a single tone and depends on the number of inputs and outputs used, including non-square versions of H when special channels such as phantom-mode signal channels are used. H is usually a square matrix that is size U×U for differential-only vectoring and (2U−1)×(2U−1) in full, two-sided vectoring with phantom-mode signals. For one-sided systems that use phantoms, any combination of an extra U modes may be assigned to either of (but not both) the downstream or upstream vectoring calculations. H may be a different matrix for each tone and usually is not the same in upstream and downstream directions. A single H is used in this disclosure to simplify notation. A complex rotor computational unit may apply a complex rotor to each such tone in either direction independently.

For upstream reception, an equivalent theoretical $H_{eq}$ is computed by pre-multiplication of H by the inverse square-root of a noise spatial-correlation matrix designated $R_{nn}^{-1/2}$. Embodiments of the present invention separate the multi-user equalizer implementation into a "static" part and an "adaptive" part. The feedforward section may be composed of a constant matrix (again, for example, implemented with complex rotors) and an adaptive matrix. The feedback section may similarly be composed of a constant triangular matrix and an adaptive triangular matrix. The constant matrices may still be initially set and perhaps updated by a controller such as a DSL optimizer, typically at infrequent intervals. The adaptive matrices are updated at the locally (for example, in the receiver), usually as frequently as needed to match the time-variations of the noise and channel.

A ZF-GDFE will perform almost the same as a minimum mean square error (MMSE) GDFE, if singular input dimensions have already been eliminated (such elimination being trivial in vectored DMT of DSL systems simply by eliminating columns/rows of H that correspond to zeroed inputs/outputs). QR factorization is not strictly defined for non-square matrices, but is easy to generalize so that the triangular factor has a few extra zeroed rows or columns in it, but retains the essential triangular structure necessary for implementation in embodiments of this invention. Further, the tonal-predictive (also known as noise-whitening) augmentation of a ZF-GDFE essentially renders it nearly (if not always exactly) equivalent to a MMSE-GDFE in performance.

The channel H can be factorized using QR decomposition where Q is a unitary matrix, and triangular matrix R can be further decomposed into SG where S is a diagonal scaling matrix that forces the diagonal elements of the triangular G to be all ones.

$$H = QR = QSG \qquad \text{Eq. (2)}$$

The factorization of the "noise-whitened-channel" is written as $$H_{eq} = R_{nn}^{-1/2} \cdot H = \overline{QSG} \qquad \text{Eq. (3)}$$

where the bars denote the dependency on the noise $R_{nn}^{-1/2}$ as well as the channel. It is well known to those skilled in the art that the feedforward filter of a GDFE receiver is $\overline{W} = \overline{S}^{-1} \overline{Q}^* R_{nn}^{-1/2}$, where noise is first whitened by $R_{nn}^{-1/2}$ and the feedforward section of $H_{eq}$ is applied by $(\overline{QS})^{-1} = (\overline{S})^{-1} \overline{Q}^*$. The $\overline{G}$ matrix is used as the feedback filter. The feedforward filter can be shown to be equivalent to $\overline{G} R^{-1} Q^*$ by using Equation (3):

$$\overline{W} = \overline{S}^{-1} \overline{Q}^* R_{nn}^{-1/2} = \overline{G} H^{-1} = \overline{G} R^{-1} Q^* = \overline{G} G^{-1} S^{-1} Q^* \qquad \text{Eq. (4)}$$

Figure 3:
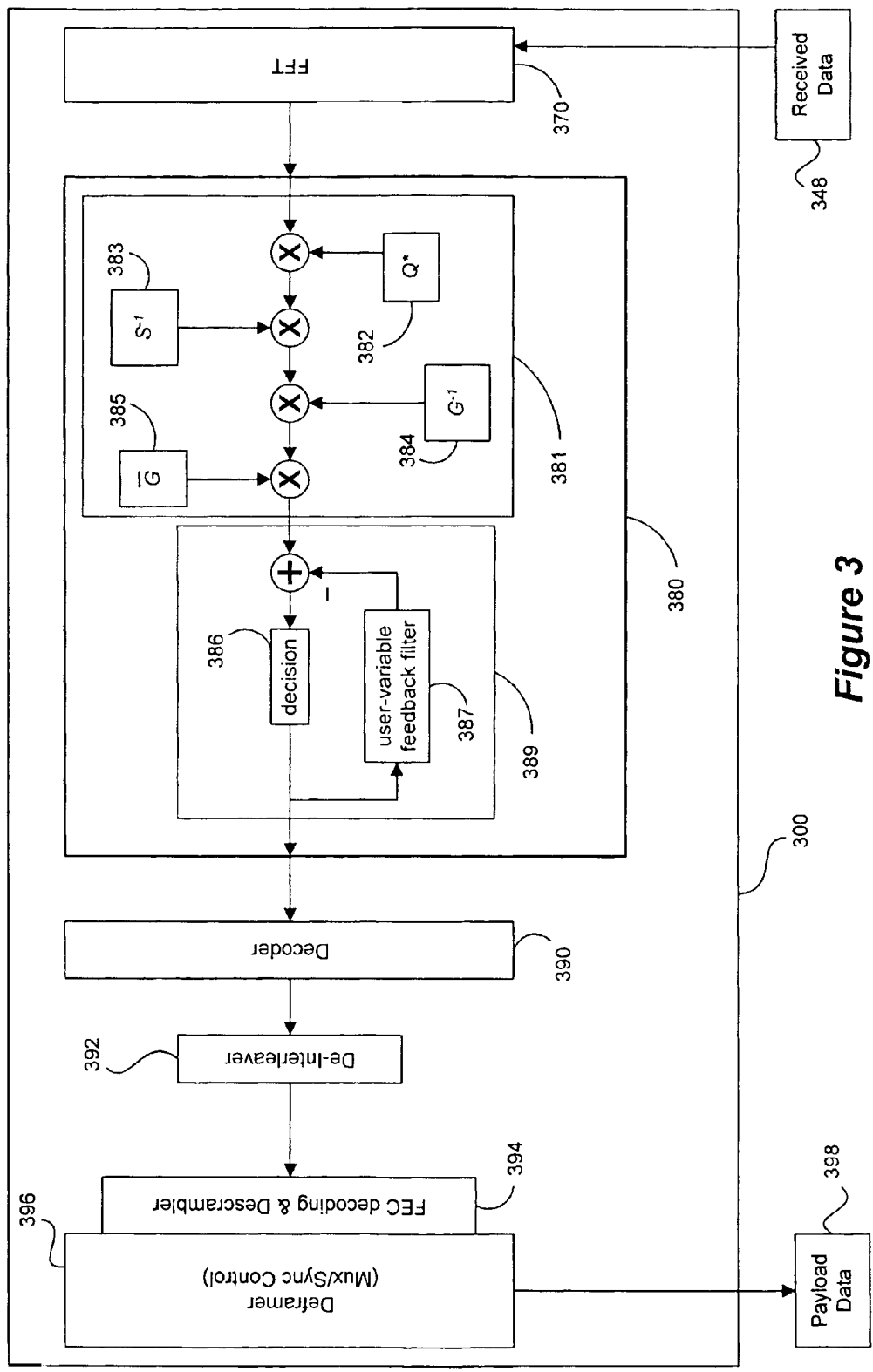
FIG. 3 is a DSL receiver usable with time-invariant noise.

A non-adaptive conventional ZF-GDFE receiver 300 that works well when both noise $R_{nn}^{-1/2}$ and the channel H are time-invariant (and poorly when either is time-variant) is shown in FIG. 3. The receiver 300 includes an FFT 370 to process incoming transmitted data 348. Moreover, receiver 300 utilizes conventional decoding 390, de-interleaving 392, FEC decoding and descrambling 394 and deframing 396 to generate payload data 398. The receiver 300 implements an upstream data processing unit 380 that includes a static feedforward filter 381 that implements $\overline{W}$ and includes components 382, 383, 384, 385, per Equation (4).

A user-data-based feedback filter unit 389 includes a filter 387 implementing a $\overline{G}$ matrix that provides a decision-feedback-based multi-user detection signal such as:

$$\overline{g}_{u,u-j} \cdot \hat{X}_{u-1} + \overline{g}_{u,u-2} + \ldots + \overline{g}_{u,1} \cdot \hat{X}_1 \qquad \text{Eq. (5)}$$

using multiple users' information obtained from decision device 386, where $\hat{X}_u$ is the output of decision unit 386 for user u. On the first cycle the filter 387 has no output, after which the number of previous-decision-using terms used to compute the output increases with each cycle until the last user for that tone is considered. These terms have coefficients that also vary with user, which is indicated by the double subscript on the labels $\overline{g}_{u,u-j}$.

The last two matrices 384, 385 of feedforward filter 381 in FIG. 3 are both triangular and thus equivalent to a user-domain predictive estimator. The Q* matrix 382 and $S^{-1}$ matrix 383 shown in FIG. 3 depend only upon channel and not on the noise and thus are essentially constant. These matrices (or their product) can be calculated, supplied and updated externally. As noted above, the non-adaptive conventional ZF-GDFE in FIG. 3 works well if the noise $R_{nn}^{-1/2}$ and channel H are constant. However, $R_{nn}^{-1/2}$ and H often are time-variant, and the performance of the conventional ZF-GDFE degrades as the noise $R_{nn}^{-1/2}$ and/or channel H changes.

When the noise and/or channel vary, the equivalent "noise-whitened-channel" can be written as $$H_{eq} = R_{nn}^{-1/2} \cdot H = \overline{QSG} = \overline{FG} \qquad \text{Eq. (6)}$$

where $\overline{F} = \overline{QS}$, and $\overline{F}$ and $\overline{G}$ are time-variant. These can be written as $$\overline{F} = \overline{F}_S + \overline{F}_A \qquad \text{Eq. (7)}$$

$$\overline{G} = \overline{G}_S + \overline{G}_A \qquad \text{Eq. (8)}$$

where $\overline{F}_S$ and $\overline{F}_A$ correspond to the static and variant additive terms of $\overline{F}$, respectively, and $\overline{G}_S$ and $\overline{G}_A$ correspond to the static and variant parts of $\overline{G}$, respectively.

Alternatively, $\overline{F}$ can be written as $$\overline{F} = \overline{F}_S' \cdot \overline{F}_A', \text{ or} \qquad \text{Eq. (9)}$$

$$\overline{F} = \overline{F}_A' \cdot \overline{F}_S' \qquad \text{Eq. (10)}$$

where $\overline{F}_S'$ and $\overline{F}_A'$ correspond to the static and variant multiplicative terms of $\overline{F}$, assuming a specified order.

Figure 4:
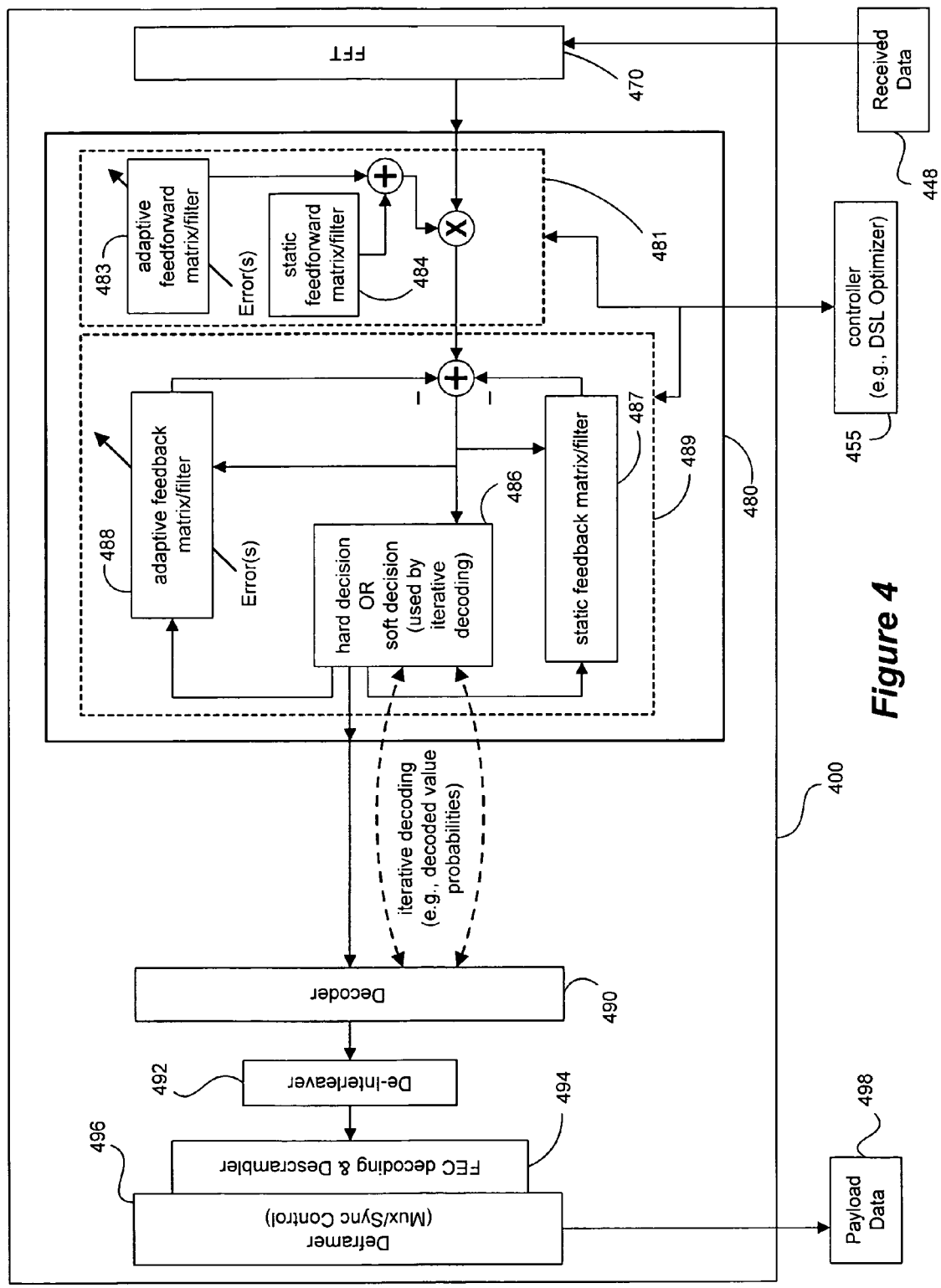
FIG. 4 is a DSL receiver usable with and/or implementing one or more embodiments of the present invention.

FIG. 4 presents an embodiment of the present invention in which a DSL device 400 (for example, an adaptive receiver) uses a GDFE according to one or more embodiments of the present invention. Unlike the non-adaptive, conventional ZF-GDFE of FIG. 3, the adaptive receiver 400 addresses time-variant noise and/or a time-variant channel, because components/sections 483 and 488 can adapt to changes in noise (for example, $R_{nn}^{-1/2}$) and channel (for example, H). In FIG. 4, a feedforward filter section 481 and a feedback filter section 489 are used, where the feedback filter section 489 provides corrections to the incoming signals. Feedforward filter section 481 includes static feedforward filter $\overline{F}_S$ 484 and adaptive feedforward filter $\overline{F}_A$ 483. Although the components of the feedforward section shown in FIG. 4 are additive, multiplicative components can be used with either the static or the adaptive component coming first, as will be appreciated by those skilled in the art. Where the incoming (received) multi-user data is a data block such as a DMT symbol or the like, the feedforward section 481 can condition or otherwise act on all users' data in the symbol, as shown in FIG. 4 (though other configurations are also available, as will be appreciated by those skilled in the art). Feedback filter section 489 includes a static feedback loop 487 and an adaptive feedback loop 488 (as with the feedforward section 481, each feedback loop can be a filter and/or matrix applicator).

The static feedforward filter 484 and the static feedback filter loop 487 provide decision-feedback-based detection for the (relatively) static parts of the multi-user environment. The adaptive feedforward filter 483 and the adaptive feedback filter loop 488 provide decision-feedback-based detection for the time-variant parts of the multi-user environment. The adaptive feedforward filter 483 typically can be used to address changes in the channel's characteristics while the adaptive feedback filter 488 can be used to address changes in the noise, though those skilled in the art will recognize that other configurations and operational characteristics can be used in keeping with the teachings of the present invention. An MMSE adaptive algorithm, such as an LMS algorithm, used on the adaptive feedforward matrix 483 and/or on the adaptive feedback loop 488 will correspondingly adjust and/or update adaptive feedforward matrix/filter 483 and/or adaptive feedback loop/filter/matrix 488 to the time-variant channel and noise so that the overall GDFE is approximately MMSE.

The feedback filter loops 487 and 488 make use of either only the output of the decision unit 486, or of both the input and the output of the decision unit 486. In the former case, the filter loop uses a $\overline{G}$ matrix to provide the following terms for subtraction:

$$\overline{g}_{u,u-j} \cdot \hat{X}_{u-1} + \overline{g}_{u,u-2} \cdot \hat{X}_{u-2} + \ldots + \overline{g}_{u,1} \cdot \hat{X}_1 \qquad \text{Eq. (11)}$$

using multiple users' information obtained from decision device 486, where $\hat{X}_u$ is the output of decision unit 486 for user u. In the latter case, the filter loop computes errors of previous users and makes use of a matrix $\overline{B}$ to provide the following terms for subtraction:

$$\overline{b}_{u,u-j} \cdot E_{u-1} + \overline{b}_{u,u-2} \cdot E_{u-2} + \ldots + \overline{b}_{u,1} \cdot E_1 \qquad \text{Eq. (12)}$$

where $E_u$ in Equation (12) is the error for filter 488, calculated as the difference between the input and the output of decision unit 486 for user u. Thus, in the latter case, the feedback loop can be characterized (as far as the use of one or more previous users' decisions is concerned) by the error-feedback filter $\overline{B}$. The two types of feedback loops (decision-feedback and error-feedback) are functionally equivalent and transforming one structure to the other is well known to those skilled in the art. As will be appreciated by those skilled in the art, Equations (11) and (12) can be shown to be mathematically the same, and so are the corresponding circuits. But there may be implementation reasons for preferring one of the other approach.

The feedforward section 481 and static feedback section 487 normally permit decisions about each individual user's data after removal of crosstalk and/or other noise from the multi-user user data based on the channel H. With these filters alone, however, spatially-correlated noise would not be optimally mitigated because the feedforward section 481 is not the optimal GDFE choice for the instantaneous $R_{nn}^{-1/2}$. To further remove the remaining spatially-correlated noise, some embodiments of the present invention implement the adaptive feedback loop 488 as an adaptive triangular matrix $\overline{B}$ to provide additional, adaptive feedback filtering. For such adaptation, the least mean-square (LMS) algorithm that is well known to those skilled in the art can be used, as explained below. Such a device whitens the spatially-correlated noise, thus leaving a smaller minimum residual variation for that noise and increasing the data rates of all the upstream lines as compared to the same level that would be obtained in a conventional implementation of FIG. 3 with instantaneous information on $R_{nn}^{1/2}$.

In other embodiments of the present invention, the crosstalk of previous users is reduced by using an adaptive feedforward section 483, and the spatially-correlated noise can be suppressed by using an adaptive feedback section 488. The static feedforward section 484 and static feedback section 487 could then be eliminated in some cases. The adaptation of sections 483 and 488 can be performed using the least mean-square (LMS) algorithm that is well known to those skilled in the art, and which is explained below. As seen in FIG. 4, one or both of sections 483 and 488 can use updated error(s) calculations and/or determinations to implement the adaptive aspects of components in some embodiments of the present invention.

The components in 483 and 488 are preferably updated locally (that is, within the receiver 400 itself) or, if a fast enough link is available, by an external controller 455 (such as a DSL optimizer). The components in 484 and 487 can be evaluated by the receiver 400 or preferably by a controller 455 (to simplify the receiver 400 and reduce computational requirements for the receiver 400 for any components that do not require actual work to be done by the receiver 400), and components 484 and 487 can possibly be re-evaluated periodically (for example, infrequently). When a DSL optimizer unit or the like is used, components 484 and 487 typically can be computed by the DSL optimizer with greater accuracy and knowledge of other users and the services desired. Units 483 and 488 essentially reduce large variations with respect to changes in the noise and channel in the level of performance among the vectored users of the binder (or whatever grouping of users is used for vectoring). Units 483 and 488 also can compensate for inaccuracies caused by inexact initial reporting of the noise matrix $R_{nn}^{-1/2}$ and/or the channel matrix H. The adaptive feedforward unit 483 and adaptive feedback unit 488 of the GDFE structure of the present invention will be zero if there is no time variation and if there are no initial reporting inaccuracies in channel and noise, but can adapt to the current channel and noise and any reporting imperfections to improve performance to the extent possible.

The feedback unit 489 can be eliminated when noise has no spatial correlation and when the so-called column dominance property is present (which occurs only for differential excitation and not for alternate signals such as phantom-mode signals). Thus, this unit 489 could be eliminated and/or disabled when appropriate (for example, in early vectored DSL systems in private networks where no phantom-mode signals are used and no alien crosstalk exists). Then the complexity reduces to the single fixed complex rotor unit implementing $S^{-1}Q^*$.

An LMS adaptive algorithm that can be used to generate the adaptive error-predictor coefficients for $\overline{B}$ is:

$$\overline{b}_{u,u-j}(k+1) = \overline{b}_{u,u-j}(k) + \mu \cdot E_u(k) \cdot E_{u-j}^*(k) \quad j=1,\ldots,u-1 \qquad \text{Eq. (13)}$$

where $E_{u-j}^*$ is the complex conjugate transpose of $E_{u-j}$ and $\mu$ is a positive gain constant used in the LMS algorithm to trade speed of convergence and tracking with accuracy of final converged result and will cause the overall structure to approximate an MMSE-GDFE, which is almost the same as a ZF-GDFE. k is the time index for LMS updates.

An LMS adaptive algorithm that can be used to generate the adaptive feedforward coefficients for $\overline{F}$ is:

$$\overline{f}_{u,v}(k+1) = \overline{f}_{u,v}(k) + \lambda \cdot Y_u(k) \cdot E_v^*(k) \qquad \text{Eq. (14)}$$

where $E_v^*$ is the complex conjugate transpose of $E_v$, $Y_u$ is the input to the feedforward section 481 for user u, and $\lambda$ is a positive gain constant used in the LMS algorithm to trade speed of convergence and tracking with accuracy of final converged result and will cause the overall structure to approximate an MMSE-GDFE, which is almost the same as a ZF-GDFE. k is the time index for LMS updates.

Adaptive units 483 and 488 can use instantaneous errors calculated from the difference between input and output of decision unit 486 (that is, from the same DMT symbol) as inputs to perform adaptation as illustrated by Equations (13) and (14), above. Those skilled to the art will recognize that algorithms other than LMS may instead be used, such as the Recursive-Least-Squares (RLS) algorithm, or other Minimum-Mean-Square-Error (MMSE) algorithms.

Feedback units 487 and 488 can use either instantaneous errors or hard/soft decisions from previously decoded users as inputs. This process resets itself after every symbol. Error propagation with such instantaneous decisions is limited to the current symbol and thus is not as serious an issue as it is in time-domain decision feedback systems where error bursts can last a long time (especially when outer trellis and/or RS codes are used to improve coding gain).

In DMT, and in particular with trellis coding that is applied independently to each of the users' tones successively within a single DMT symbol, significant gain in performance with the GDFE is possible if iterative decoding is used, using iterations between the decoder 490 and the multi-user detector 489. As indicated in device 486 of FIG. 4, the hard decision device is replaced by a computation unit that computes the likelihood of each possible decision that could have been made rather than immediately selecting one value and eliminating all others. The output of the decision device to the feedback filters 487 and 488 is a soft decision, and the output of the decision device to the decoder 490 is the calculated likelihood (soft information). Other users' soft information will affect such soft information, which can in turn be passed to the decoder 490 for the trellis code of each user (which runs along the tones and terminates itself each symbol). The net effect is that other users' codes can help eliminate any errors on a current user and vice versa. The ultimate maximum a posteriori decoder limit can correspond to considerably higher coding gain than a single trellis code alone (but of course never exceeding the capacity limit).

Vector-DMT with a GDFE receiver already has large performance gains relative to non-vectored receivers when FEXT and/or noise spatial correlation are significant. The extra iterative decoding gain (~0-2 dB) may be attained, but at perhaps a trade-off in the complexity of the iterative decoding that is higher than desired.

In summary, embodiments of the present invention provide an adaptive GDFE, apparatus and devices embodying and implementing the same, and related methods and techniques that operate on each user dimension independently with user-variable coefficients that implement the user-variable device with a feedforward component and a feedback component. This GDFE can terminate and restart with each symbol period, which reduces the error-burst lengths of any error propagation. Moreover, this GDFE improves upon earlier systems that missed the time-variation issue and presumed that the channel and noise are constant, which, in fact, is often not the case. Either the feedforward or the feedback module, or both, may be separated into a static and an adaptive component. If the channel and noise are stationary, then the adaptive components can be removed without hurting the performance of the decoder. Otherwise, and in most practical situations, the adaptive operation is required to improve performance.

The system can bit/gain swap, so the number of bits and decisions can change on each tone of each user. When this happens, the feedforward and/or feedback sections will need to change correspondingly.

Various apparatus according to the present invention can implement one or more of the methods and/or techniques discussed above. According to one embodiment of the present invention shown in FIG. 5A, a GDFE control unit 500 may be part of an independent entity coupled to a DSL system, such as a controller 510 (for example, a device functioning as or with a DSL optimizer, DSM server, DSM Center or a dynamic spectrum manager) assisting users and/or one or more system operators or providers in operating and, perhaps, optimizing use of the system, including implementation of one or more GDFEs at one or more upstream receivers. (A DSL optimizer may also be referred to as a dynamic spectrum manager, Dynamic Spectrum Management Center, DSM Center, System Maintenance Center or SMC.) In some embodiments, the controller 510 may be a completely independent entity, while in other embodiments the controller 510 may be in or part of an ILEC or CLEC operating a number of DSL lines from a CO or other location. As seen from the dashed line 546 in FIG. 5A, the controller 510 may be in the CO 146 or may be external and independent of CO 146 and any company operating within the system. Moreover, controller 510 may be coupled to, communicating with and/or controlling DSL and/or other communication lines in multiple COs.

In some embodiments of the present invention, the controller 510 controls and/or communicates with a vectored DSL system in a specific binder or other specified group of DSL lines, for example communicating with one or more upstream receivers. The DSL lines can be ADSL, VDSL and/or other communication lines in various combinations. The GDFE control unit 500 has access (directly or indirectly) to information and/or data regarding the various lines in the subject binder and may be able to control certain aspects of those lines' operation. For example, the GDFE control unit 500 may initially set and/or update the feedforward and/or feedback matrices in an upstream receiver, such as the one shown in FIG. 4. In some embodiments the GDFE control unit 500 might only update the static components of a receiver, as discussed in more detail above. Also, the GDFE control unit 500 may enable and/or disable operation of an adaptive GDFE, as appropriate.

Figure 5A:
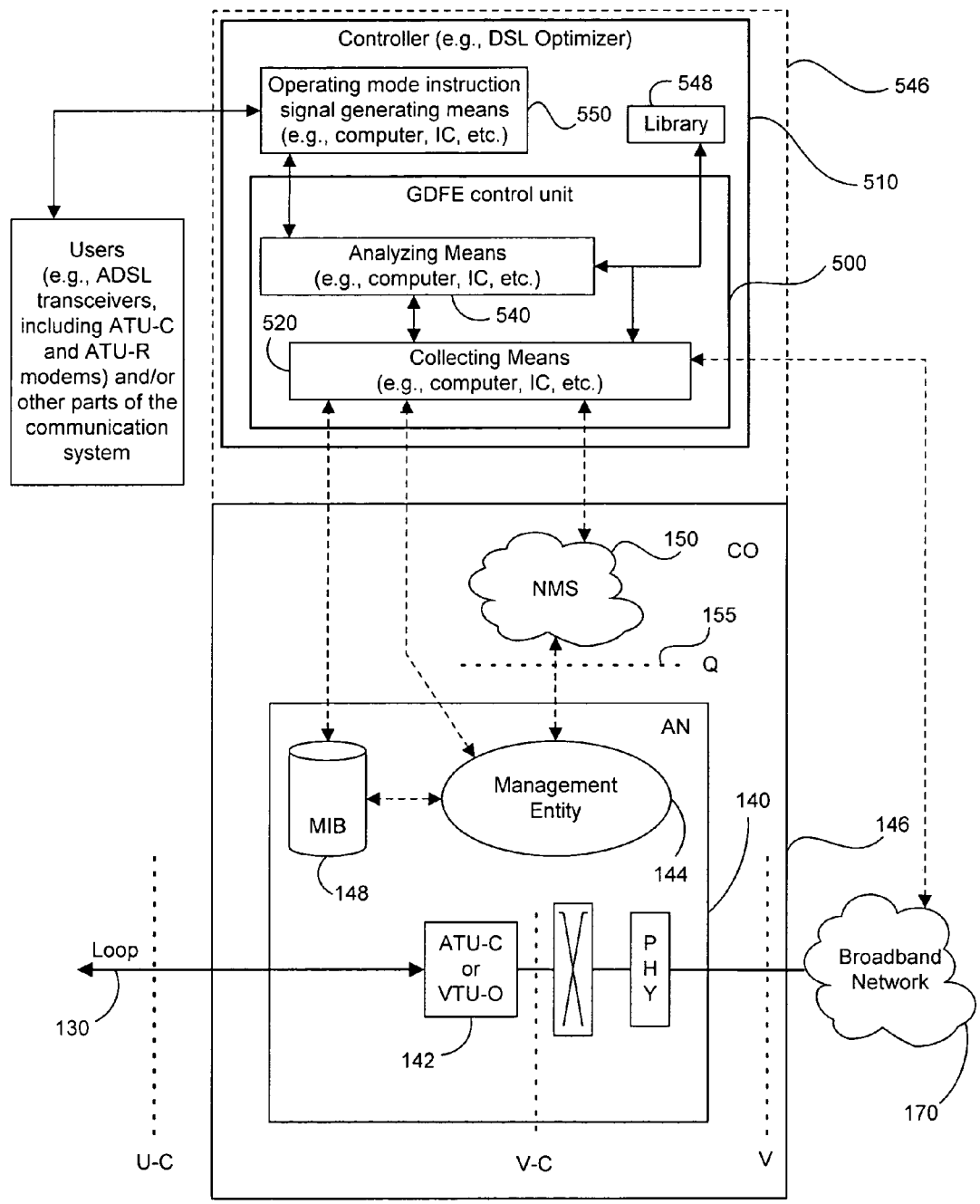
FIG. 5A is a controller including a compliance control unit according to one embodiment of the present invention.

The GDFE control unit 500 includes a data collection unit 520 identified as a collecting means and an analysis unit 540 identified as analyzing means. As seen in FIG. 5A, the collecting means 520 (which can be a computer, processor, IC, computer module, etc. of the type generally known) may be coupled to NMS 150, ME 144 at AN 140 and/or the MIB 148 maintained by ME 144, any or all of which may be part of an ADSL and/or VDSL system for example. Data also may be collected through the broadband network 170 (for example, via the TCP/IP protocol or other protocol or means outside the normal internal data communication within a given DSL system). One or more of these connections allows the GDFE control unit 500 to collect operational data from the system (for example, to be used in generating and/or updating one or more matrices used in an adaptive GDFE). Data may be collected once or over time. In some cases, the collecting means 520 will collect on a periodic basis, though it also can collect data on-demand or any other non-periodic basis, thus allowing the GDFE control unit 500 to update its information, operation, etc., if desired.

In the exemplary system of FIG. 5A, the analyzing means 540 (which also can be a computer, processor, IC, computer module, etc. of the type generally known) is coupled to a DSLAM, modem and/or system operating signal generating means 550 inside or outside the controller 510. This signal generator 550 (which can be a computer, processor, IC, computer module, etc.) is configured to generate and send instruction signals to modems and/or other components of the communication system (for example, ADSL and/or VDSL transceivers and/or other equipment, components, etc. in the system). These instructions may include commands adaptively turning on and off an adaptive GDFE, requesting new and/or updated channel crosstalk and insertion loss information, and requesting and providing data relating to matrices and/or any other operational characteristics of the relevant communication lines.

Embodiments of the present invention can utilize a database, library or other collection of data pertaining to the data collected, past operation of the vectored DSL system and any other relevant lines and equipment. This collection of reference data may be stored, for example, as a library 548 in the controller 510 of FIG. 5A and used by the analyzing means 540 and/or collecting means 520.

In various embodiments of the invention, the GDFE control unit 500 may be implemented in one or more computers such as PCs, workstations or the like. The collecting means 520 and analyzing means 540 may be software modules, hardware modules or a combination of both, as will be appreciated by those skilled in the art. When working with a large numbers of modems, databases may be introduced and used to manage the volume of data collected.

Figure 5B:
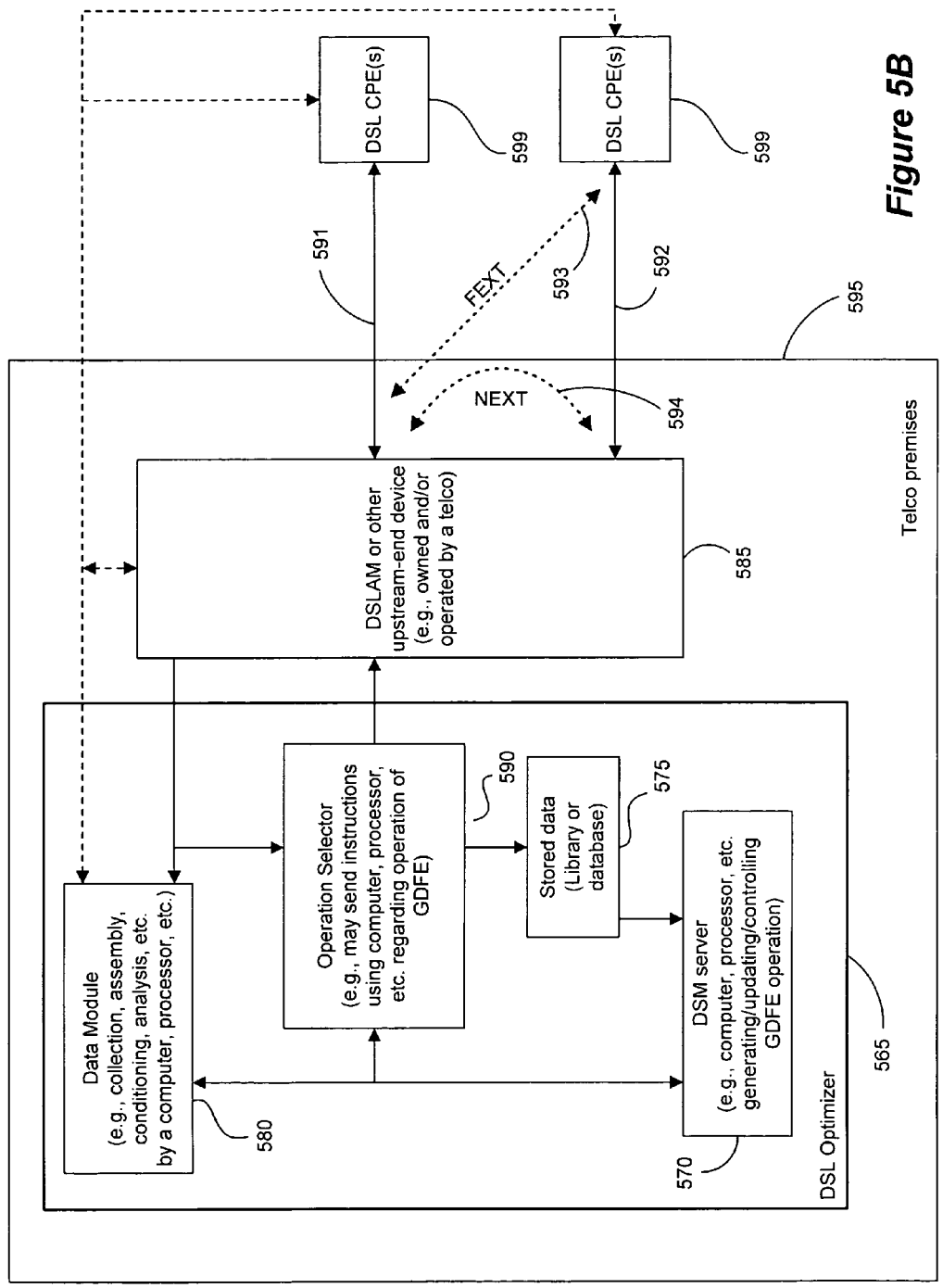
FIG. 5B is a DSL optimizer according to one embodiment of the present invention.

Another embodiment of the present invention is shown in FIG. 5B. A DSL optimizer 565 operates on and/or in connection with a DSLAM 585 or other DSL system component, either or both of which may be on the premises 595 of a telecommunication company (a "telco"). The DSL optimizer 565 includes a data module 580, which can collect, assemble, condition, manipulate and supply operational data for and to the DSL optimizer 565. Module 580 can be implemented in one or more computers such as PCs or the like. Data from module 580 is supplied to a DSM server module 570 for analysis (for example, evaluating the need for an adaptive GDFE in a given upstream-end receiver, evaluating channel-related matrices and/or other data used in an adaptive GDFE, etc.). Information also may be available from a library or database 575 that may be related or unrelated to the telco. Server 570 can be implemented in one or more computers and/or computer systems such as PCs or the like.

An operation selector 590 may be used to implement, modify and/or cease DSL and/or other communication operations, including implementation of various operational parameters involving transmit power, carrier masks, etc. Moreover, implementing embodiments of the present invention, selector 590 can send instructions regarding operation of an adaptive GDFE and data and/or information to support such operation (for example, initial and/or updated feedforward and/or feedback matrix information, the PSDMASK and power levels for the users, etc.). Decisions can be made by the DSM server 570 or in any other suitable manner, as will be appreciated by those skilled in the art. Operational modes and/or parameters selected by selector 590 are implemented in the DSLAM 585, one or more upstream receivers, and/or any other appropriate DSL system component equipment. Such equipment may be coupled to DSL equipment such as customer premises equipment 599. The system of FIG. 5B can operate in ways analogous to the system of FIG. 5A, as will be appreciated by those skilled in the art, though differences are achievable while still implementing embodiments of the present invention.

Figure 6:
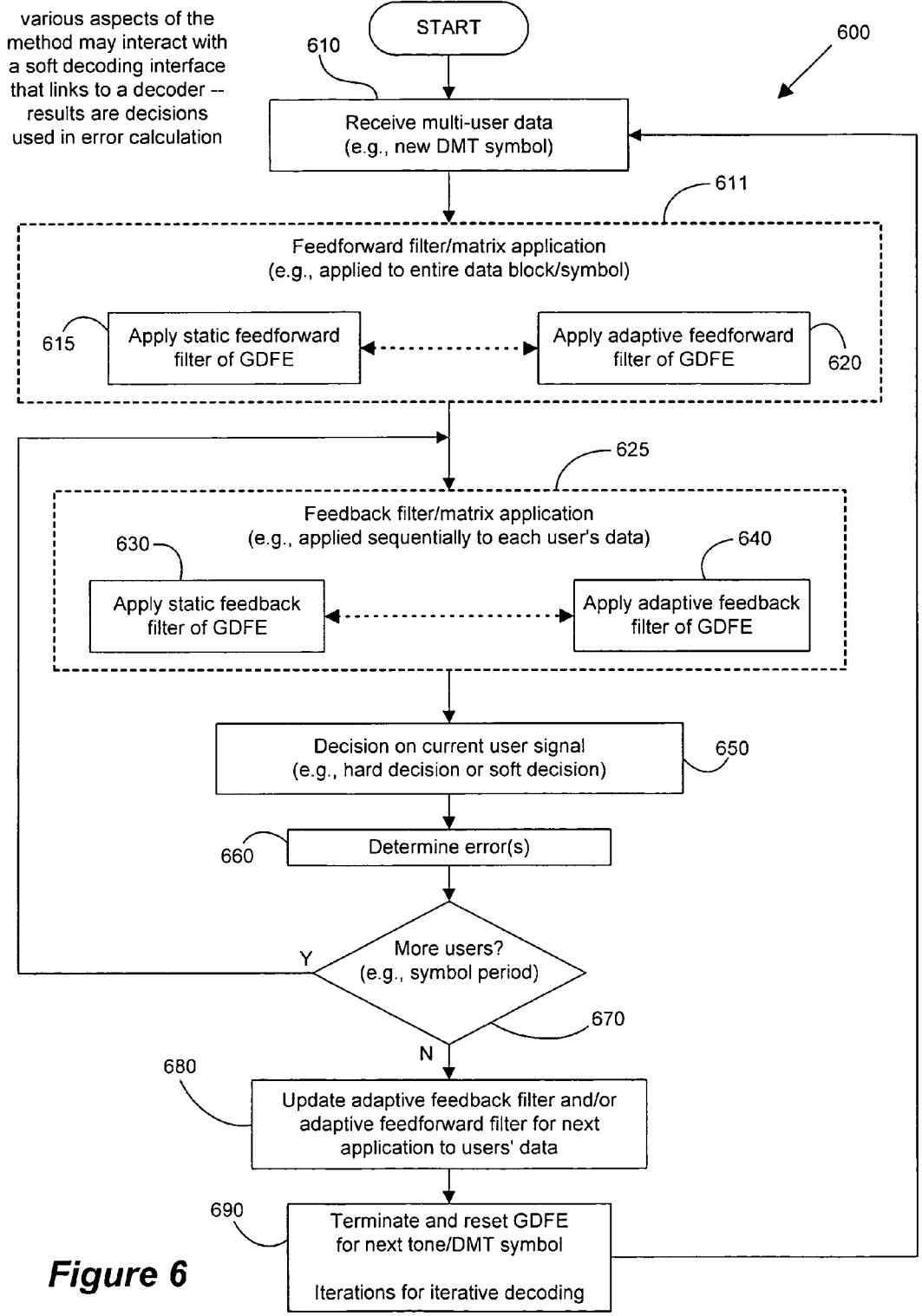
FIG. 6 is a flow diagram illustrating one or more embodiments of the present invention.

A method 600 according to one or more embodiments of the present invention is shown in FIG. 6. Method 600 begins with the receipt of data 610, for example the receipt of a DMT symbol or other multi-user data block at an upstream vectored DSL system receiver or other DSL device. In a vectored DMT DSL system, this symbol is a multi-user data block for a given tone used in the DMT scheme, as will be appreciated by those skilled in the art. The received data block is transmitted to a feedforward filter/matrix application 611, which can include a static feedforward filter/matrix 615 and an adaptive feedforward filter/matrix 620. Section 611 is configured to adapt as necessary to any time-varying changes to noise and/or channel. Any static feedforward filter of the adaptive GDFE can be applied at 615, such as applying a feedforward matrix to data supplied by the output of a fast Fourier transform unit. The adaptive feedforward filter can be applied at 620 using an adaptive matrix as described above. The feedforward filters can be applied in any order, as indicated in FIG. 6, with either the static filter first, and the adaptive filter second, or with the adaptive filter first, and the static filter second. Also, the static and adaptive filters may be combined into a single filter and applied simultaneously on the data.

The multi-user data is then passed to a feedback section 625, which can include a static feedback filter/matrix 630 and/or an adaptive feedback filter/matrix 640 that can be applied to the user data. A static feedback filter is applied at 630, for example using a static matrix as described above. At 640 the adaptive feedback filter is applied, for example using an adaptive matrix as described above. Because the filters of 630, 640 are subtracted from the same signal, they can be applied in any sequence or simultaneously, as indicated in FIG. 6. As will be appreciated by those skilled in the art, the feedback filters might not be necessary in processing the first user's data in the multi-user data block or symbol, depending on the data extraction technique implemented in method 600.

Once the feedforward and feedback filters have been applied to the user data, a decision can be made at 650 on the current user's signal (if iterative decoding is used, then the iterative decoding of user data can be updated as appropriate). When a decision has been made on the user signal/data, then one or more errors can be determined at 660, as described in more detail above. If more users' data has to be processed in the current DMT symbol, then decision 670 returns to feedback filters 630 and 640 to process the next user's data. If all users' data has been processed in the current DMT symbol, then the adaptive feedforward and/or feedback filters can be updated at 680 with the current error and noise information available (actually, updating of the adaptive filters can occur at any time, whenever the needed error and noise information is available).

If method 600 has reached the end of the symbol period and no further data needs to be evaluated for the current tone (or other data block or symbol), then the adaptive GDFE terminates and resets at 690, after which the method may return to 610 to receive the next DMT tone of multi-user data or to revisit an iterative decoding process.

Generally, embodiments of the present invention employ various processes involving data stored in or transferred through one or more computer systems, which may be a single computer, multiple computers and/or a combination of computers (any and all of which may be referred to interchangeably herein as a "computer" and/or a "computer system"). Embodiments of the present invention also relate to a hardware device or other apparatus for performing these operations. This apparatus may be specially constructed for the required purposes, or it may be a general-purpose computer and/or computer system selectively activated or reconfigured by a computer program and/or data structure stored in a computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 7:
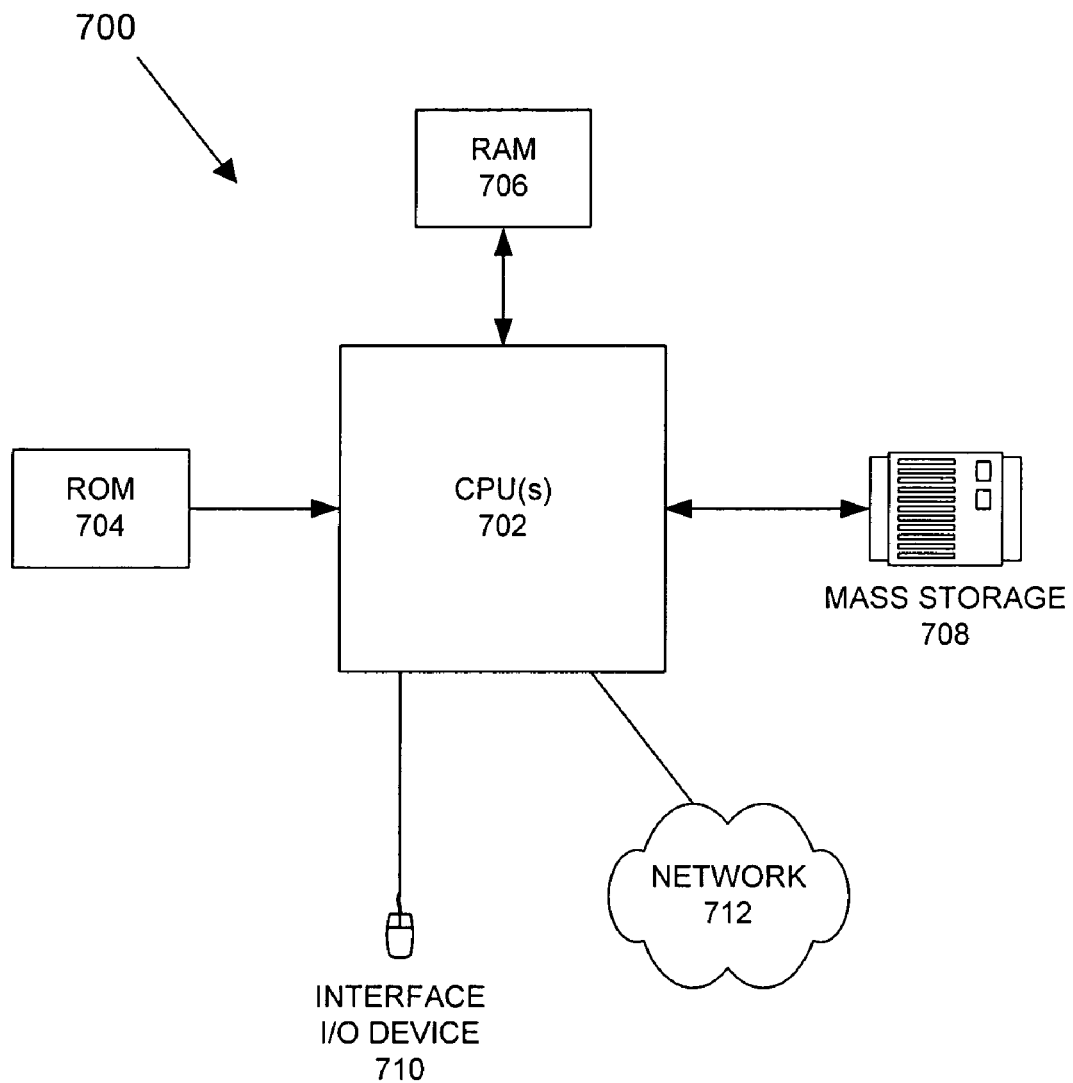
FIG. 7 is a block diagram of a typical computer system or integrated circuit system suitable for implementing embodiments of the present invention.

FIG. 7 illustrates a typical computer system that can be used by a user and/or controller in accordance with one or more embodiments of the present invention. The computer system 700 includes any number of processors 702 (also referred to as central processing units, or CPUs) that are coupled to storage devices including primary storage 706 (typically a random access memory, or RAM), primary storage 704 (typically a read only memory, or ROM). As is well known in the art, primary storage 704 acts to transfer data and instructions uni-directionally to the CPU and primary storage 706 is used typically to transfer data and instructions in a bi-directional manner. Both of these primary storage devices may include any suitable of the computer-readable media described above. A mass storage device 708 also is coupled bi-directionally to CPU 702 and provides additional data storage capacity and may include any of the computer-readable media described above. The mass storage device 708 may be used to store programs, data and the like and is typically a secondary storage medium such as a hard disk that is slower than primary storage. It will be appreciated that the information retained within the mass storage device 708, may, in appropriate cases, be incorporated in standard fashion as part of primary storage 706 as virtual memory. A specific mass storage device such as a CD-ROM 714 may also pass data uni-directionally to the CPU.

CPU 702 also is coupled to an interface 710 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 702 optionally may be coupled to a computer or telecommunications network using a network connection as shown generally at 712. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a codeword composition controller may be stored on mass storage device 708 or 714 and executed on CPU 702 in conjunction with primary memory 706. In a preferred embodiment, the controller is divided into software submodules.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A method of compensating noise in a vectored DSL receiver, the method comprising:
   receiving multi-user data from at least two multi-line channels at the vectored receiver;
   applying a multi-user static generalized decision feedback equalizer GDFE function to the received data to compensate for time invariant noise in the multi-user data; and
   applying a multi-user adaptive GDFE function to the received data to compensate for time variant noise in the multi-user data, wherein the time variant noise comprises at least spatially correlated noise within the multi-user data, the applying further comprising:
      collecting channel information including channel changes and the time variant noise in the multi-user data;
      updating, based on the collected channel information, one or more adaptive feedback or adaptive feedforward filter coefficients calculated from the output of a decision device or the difference between an input and an output of the decision device; and
      applying a multi-user adaptive feedfoward filter to compensate the channel changes and a multi-user adaptive feedback filter to compensate the spatially correlated noise, wherein the adaptive filters use the one or more updated adaptive filter coefficients.

2. The method of claim 1 wherein the multi-user data are DMT symbols from a vectored DMT DSL system; and
   further wherein the method is applied on a tonal basis to the DMT symbols.

3. The method of claim 1 wherein applying the static GDFE function comprises at least one of the following:
   applying a static feedforward filter; or
   applying a static feedback filter.

4. The method of claim 1 wherein the static GDFE function comprises at least one of the following:
   a decision-feedback filter; or
   an error predictor.

5. The method of claim 1 wherein the adaptive GDFE function uses an adaptive algorithm and one or more errors calculated from the difference between the decision device input and output to do at least one of the following:
   estimate one or more current coefficients of an adaptive feedforward filter; or
   estimate one or more current coefficients of an adaptive feedback filter.

6. The method of claim 5 wherein the decision output is one of the following:
   a soft decision output; or
   a hard decision output.

7. A method of compensating noise in a vectored DSL receiver with a multi-user adaptive generalized decision feedback equalizer (GDFE) in a vectored DMT DSL system, the method comprising:
   receiving multi-user data at the vectored DSL receiver;
   performing an FFT to generate transformed multi-user data;
   applying adaptive generalized decision feedback equalization to the transformed multi-user data on a tonal basis, wherein adaptive generalized decision feedback equalization includes at least the following:
      collecting channel information including channel changes and time variant noise in the multi-user data wherein the time variant noise comprises cross-talk and spatially-correlated noise within the multi-user data;
      updating, based on the collected channel information, one or more adaptive feedback or adaptive feedforward filter coefficients calculated from a decision device output or the difference between inputs and outputs of the decision device to compensate the channel changes and time variant noise; and
      applying an adaptive feedforward filter to the multi-user data to compensate the channel changes and the cross-talk; and
      applying an adaptive feedback filter to the multi-user data to compensate the spatially correlated noise, wherein at least one of the applied adaptive filters employs the one or more updated coefficients.

8. The method of claim 7 wherein at least one of the adaptive filters uses one of the following:
   a least-mean-squares algorithm;
   a recursive-least-squares algorithm;
   a minimum-mean-square-error algorithm; or
   a zero-forcing algorithm.

9. The method of claim 7 further comprising performing at least one of the following:
   bit swapping; or
   gain swapping.

10. The method of claim 7 further comprising applying static generalized decision feedback equalization to the transformed multi-user data on a per-tone basis, wherein static generalized decision feedback equalization includes applying a static feedforward filter to the multi-user data;

further wherein applying the static feedforward filter and the applying the adaptive feedforward filter comprise one of the following:

applying the static feedforward filter first and the adaptive feedforward filter second;

applying the adaptive feedforward filter first and the static feedforward filter second; or combining the static and adaptive feedforward filters into a single filter and applying the resultant single filter.

11. A vectored DMT DSL device comprising:

a multi-user data reception input;

an FFT coupled to the data reception input;

a multi-user adaptive generalized decision feedback equalizer GDFE having a GDFE input coupled to the FFT, wherein the adaptive GDFE comprises an adaptive feedforward filter and an adaptive feedback filter; and a decision device configured to receive collected channel information including channel changes and time variant noise comprising at least spatially-correlated noise within the multi-user data, wherein the decision device is coupled to the adaptive filters to update at least one of feedback filter coefficients and feedforward filter coefficients based on an output of the decision device or the difference between an output of the decision device and an input of the decision device to compensate the channel changes with the adaptive feedforward filter and to compensate the spatially correlated noise with the adaptive feedback filter.

12. The DSL device of claim 11 wherein the adaptive GDFE further comprises one of the following:

a static feedforward filter coupled between the GDFE input and the adaptive feedforward filter; or the adaptive feedforward filter coupled between a static feedforward filter and GDFE input.

13. The DSL device of claim 11 wherein the adaptive GDFE comprises both an adaptive feedforward filter and an adaptive feedback filter.

14. The DSL device of claim 11 wherein the adaptive GDFE is configured to receive the channel information from a controller external to the DSL device.

15. The DSL device of claim 14 wherein the controller is a DSL optimizer.

16. The method of claim 1, wherein the time variant noise comprises cross-talk or noise spatially correlate between at least a first user's data and a second user's data within the multi-user data.

17. The method of claim 1, wherein the one or more filter coefficients are updated substantially instantaneously, based on the collected channel information while the static GDFE function is re-evaluated periodically at a rate less frequent than adaptive filter coefficients are updated.

18. The method of claim 1, wherein the one or more filter coefficients of the adaptive GDFE function are updated either within the vectored receiver or by an external controller.

* * * * *